US012791821B2

(12) United States Patent
Fahlbusch et al.

(10) Patent No.: US 12,791,821 B2
(45) Date of Patent: Nov. 10, 2026

(54) APPARATUS FOR ATTACHING A MICROSCOPE OBJECTIVE

(71) Applicant: Carl Zeiss Microscopy GmbH, Jena (DE)

(72) Inventors: Ingo Fahlbusch, Goettingen (DE); Johannes Knoblich, Jena (DE); Wolfgang Bathe, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 301 days.

(21) Appl. No.: 18/619,706

(22) Filed: Mar. 28, 2024

(65) Prior Publication Data

US 2024/0329358 A1 Oct. 3, 2024

(30) Foreign Application Priority Data

Mar. 29, 2023 (DE) ......................... 102023108048.2

(51) Int. Cl.

| | |
|---|---|
| ***G02B 7/02*** | (2021.01) |
| ***G02B 7/14*** | (2021.01) |
| ***G02B 21/24*** | (2006.01) |

(52) U.S. Cl.

CPC ................ *G02B 7/022* (2013.01); *G02B 7/14* (2013.01); *G02B 21/24* (2013.01); *G02B 21/248* (2013.01)

(58) Field of Classification Search

CPC .......... G02B 7/022; G02B 7/14; G02B 21/24; G02B 21/248

USPC .......................................... 359/368, 827–830

See application file for complete search history.

(56) References Cited

U.S. PATENT DOCUMENTS

| | | | |
|---|---|---|---|
| 4,515,439 | A | 5/1985 | Esswein |
| 2004/0085629 | A1 | 5/2004 | Zimmermann et al. |
| 2009/0128934 | A1 | 5/2009 | Plangger |
| 2013/0027768 | A1 | 1/2013 | Fahlbusch et al. |
| 2014/0313603 | A1 | 10/2014 | Fahlbusch et al. |
| 2016/0040705 | A1 | 2/2016 | Peter et al. |
| 2021/0011267 | A1 | 1/2021 | Fahlbusch et al. |
| 2021/0149173 | A1 | 5/2021 | Knoblich et al. |

(Continued)

FOREIGN PATENT DOCUMENTS

| | | | |
|---|---|---|---|
| AT | 505 258 | A1 | 12/2008 |
| DE | 32 02 461 | C1 | 6/1983 |

(Continued)

*Primary Examiner* — George G. King

(74) *Attorney, Agent, or Firm* — Christensen, Fonder, Dardi & Busse PLLC; John P. Fonder

(57) ABSTRACT

An apparatus for fastening a microscope objective to a microscope component. The apparatus having a receptacle which is fastened to the microscope component and includes an annular base, a retaining collar with a lateral opening, and a ring part, with an eye for attaching the microscope objective and with two retaining flattened portions, and two opposite flattened portions which are set back relative to the retaining flattened portions the ring part configured such that its flattened portions can be pushed through the opening into the retaining collar into a pre-locking position. In the pre-locking position not all retaining flanges engage in the retaining collar, and the ring part can be rotated into a locking position in which all retaining flanges engage in the retaining collar. A securing cam is formed at the edge of the opening and a securing projection is formed at one end of one of the flattenings.

8 Claims, 8 Drawing Sheets

(56) References Cited

U.S. PATENT DOCUMENTS

| | | | | |
|---|---|---|---|---|
| 2023/0116753 | A1 | 4/2023 | Fahlbusch et al. | |
| 2024/0329380 | A1* | 10/2024 | Fahlbusch .............. | G02B 7/022 |

FOREIGN PATENT DOCUMENTS

| | | | |
|---|---|---|---|
| DE | 102 51 379 | A1 | 5/2004 |
| DE | 10 2010 001 604 | A1 | 8/2011 |
| DE | 10 2013 006 720 | A1 | 10/2014 |
| DE | 10 2013 006 997 | A1 | 10/2014 |
| DE | 10 2017 208 615 | A1 | 11/2018 |
| DE | 10 2018 205 897 | A1 | 10/2019 |
| DE | 10 2019 218 705 | A1 | 6/2021 |
| DE | 10 2021 126 096 | A1 | 4/2023 |
| WO | WO 2011/095609 | A1 | 8/2011 |

* cited by examiner

APPARATUS FOR ATTACHING A MICROSCOPE OBJECTIVE

PRIORITY CLAIM

The present application claims priority to German Patent Application No. 102023108048.2, filed on Mar. 29, 2023, which said application is incorporated by reference in its entirety herein.

FIELD OF THE INVENTION

The invention relates to an apparatus for attaching a microscope objective to a microscope component, preferably a microscope stand, wherein the apparatus comprises a mount or receptacle which is arranged or fastened to the microscope component and comprises an annular base and a retaining collar with a lateral opening, and a ring part which comprises an eye for fastening a microscope objective or is attached or arranged on the microscope objective, which comprises at least two retaining flattened portions, and which has two opposite flattened portions which are set back relative to an outer circumference of the retaining flattened portions, the distance between the flattened portions being less than the width of the lateral opening, so that the ring portion with its flattened portions can be pushed through the lateral opening transversely to the ring axis of the mount or receptacle into the retaining collar into a pre-locking position, wherein in the pre-locking position not all retaining flanges engage in the retaining collar and wherein the ring portion can be rotated from the pre-locking position in the receptacle into a locking position in which all retaining flanges engage in the retaining collar.

BACKGROUND OF THE INVENTION

Such an apparatus for attaching a microscope objective is known from DE 10 2010 001 604 A1 or DE 10 2013 006 997 A1. Further apparatus for attaching a microscope objective can be found in DE 3 202 461 C1, DE 10 251 379 A1, DE 10 2019 218 705 A1, WO 2011/095 609 A1 and DE 10 2017 208 615 A1.

SUMMARY OF THE INVENTION

The object of the invention is to improve the attachment of a microscope objective—in particular in such a way that operating errors are avoided.

The invention is defined in the independent claim; the dependent claims relate to preferred further embodiments.

The apparatus is used for attaching a microscope objective to a microscope component, preferably a microscope stand, to which reference is made in part below purely by way of example. The apparatus comprises a mount or receptacle and a ring part fastened therein, which together form an objective lens interface.

The mount or receptacle is arranged on the microscope component, e.g. formed there, or can be attached there. The mount has an annular base and a retaining collar projecting from it, in which a lateral opening is provided. It can also be referred to as a bayonet mount.

The ring part has the basic shape of a ring. It comprises an eye for attaching the microscope objective or is attached or formed directly on the microscope objective. It further comprises at least two retaining flanges and has two opposing flattened portions that are set back from an outer circumference of the retaining flanges. This creates the shape of a ring with two flattened portions when viewed from above. Due to its function, the ring part can also be referred to as a bayonet flange, as it provides a bayonet flange for the microscope objective.

The distance between the flattened portions is less than the width of the side opening. This allows the ring part with its flattened portions to be pushed through the lateral opening at right angles to the ring axis of the mount into the retaining collar; the ring part can therefore also be referred to as a slide-in part. This results in a pre-locking position in which not all retaining flanges (yet) engage in the retaining collar. As a rule, those retaining flange(s) do not engage with the retaining collar, that is/are located at the rear in the direction of insertion. From the pre-locking position, the ring part can be rotated in the mount or receptacle into a locking position, in which all retaining flanges then engage with the retaining collar. Fastening is therefore achieved by the sequence of lateral insertion into the pre-locking position and rotation into the locking position. Lateral insertion can also be done from a position in which locking cams allow insertion. This means that insertion is not only necessary completely from the side, but also in a relative position in which the ring openings of the receptacle and of the ring part already partially overlap. This is achieved first by axial insertion along the ring axis and then insertion transverse to the ring axis. The pre-locking position is also referred to as the engaged state.

A securing cam is formed on the edge of the opening in the receptacle, which protrudes towards the inside of the retaining collar. A protruding securing projection is formed on the ring part at one end of one of the flattened portions. In the pre-locking position, this comes to rest between the securing cam and the base. It secures and blocks the ring part against loosening from the mount along the ring axis-even in the pre-locking position. The securing cam and securing protrusion together thus form a drop protection for the typical upright microscope design when the microscope objective is in the pre-locking position. This prevents incorrect operation that could damage the objective, as the user can release the objective in the pre-locked position without risk of dropping it.

At least one axially protruding pin could be provided on the ring part and a corresponding T-slot on the mount to prevent the lens from falling. However, the pin would always protrude significantly above the top of the ring part, i.e. the side of the ring part facing the mount, which would cause an objective placed on a table to tilt and fall over more easily. It is therefore preferable not to have a pin on the side of the ring part that is oriented towards the mount. A T-slot in the mount would also be expensive to manufacture and would have a negative effect on the stability and dimensional accuracy of the mount. It is therefore preferable that no T-slot is formed on the side of the mount or receptacle that is oriented towards the ring part.

An additional drop guard is optional. It comprises a groove through which the securing cam runs while the ring part is rotated into the locking position. The groove is formed by a protrusion that prevents the ring part from slipping downwards out of the mount or receptacle in relation to the actual fastening position, as the securing cam is secured by the projection even if it is no longer held by the securing projection. The additional drop protection is thus effective while the ring part is rotated from the pre-locking position into the locking position.

In the area of the flattened portion, the protruding securing projection does not protrude into the groove. The groove on the flattened side serves to enable the ring part to be inserted into the ring-shaped receptacle in the first place. When the ring part is then rotated from the pre-locking position into the locking position, the ring part is secured against falling off by the ring-shaped dovetail guide on its section that rotates into the retaining collar of the mount or receptacle—i.e. the side of the securing projection facing away from the securing cam. In relation to the rotation process, during the locking process the angular areas in which the securing cam and securing projection overlap and in which the ring-shaped dovetail guide comes into play overlap. This ensures a constant drop guard during rotation, except for a small angular range of 7°-9° during the turning process.

The securing cam can be provided with an advantageous dual function if it comprises a repositioning element on a side facing away from the opening, which pushes the ring part back in the direction of the pre-locking position when the ring part rotates beyond an end position assigned to the locking position.

This rotation of the ring part beyond an end position assigned to the locking position represents an over-rotation. The repositioning element is configured in such a way that an over-rotated ring part can be repositioned in the mount or receptacle and jamming in the over-rotated position is avoided. The securing cam thus has a second function against incorrect operation. In the embodiment with the groove, the repositioning element preferably engages the end of the groove when it is pressed back.

Preferably, the repositioning element comprises a pin that is biased on the securing cam in a direction away from the opening. The clamping force is optionally designed so that the ring part remains in a V-support. This does not prevent over-rotation, but it is corrected by the repositioning element. A repeatable position can therefore be achieved and accidental incorrect operation is ruled out.

It is preferable that at least one pair of magnets is arranged on the mount or receptacle and the ring part, of which one individual magnet is attached to the mount or receptacle and the other to the ring part, whereby the individual magnets are arranged in such a way that they pull the ring part and the mount or receptacle together along the ring axis in the pre-locking position. The pair of magnets supports the holding of the attached objective.

The ring part can be pushed into the mount, and the ring part and the mount can be brought into the locking position, in which there is play between the ring part and the mount. Preferably, a clamping unit clamps the ring part to the receptacle in the locking position and thus eliminates the play in the locking position.

The mount can, for example, be pre-mounted on the microscope on the stand side or can be used as a unit in an objective nosepiece of the microscope.

In embodiments, the outside of the ring part comprises conical retaining projections and the retaining collar of the mount has a matching mating cone on its inside. The ring part can be pushed through the lateral opening in the retaining collar into the pre-locking position, in which the ring openings overlap, and the ring part and the receptacle can be moved from the pre-locking position by mutual rotation into the locking position, in which the conical retaining projections of the ring part are held on the mating cone of the retaining collar and the ring part presses onto the base ring. At least three retaining projections can be provided.

The underside of the ring part facing a base of the mount or receptacle or the upper side of the base facing the ring part can comprise flat elements formed for support, e.g. three. The ring part can comprise magnets and the receptacle can comprise counter magnets that are arranged complementary to the magnets in the locking position. In this way, the ring part can be subjected to a magnetic force of attraction and pulled into the locking position.

The retaining protrusions and/or the plane elements and/or the magnets/counter-magnets can form defined contact points which clearly and reproducibly determine the position of the ring part in the receptacle in the locking position.

BRIEF DESCRIPTION OF THE DRAWINGS

In the following, the invention is explained in more detail with reference to the attached drawings, which also disclose features essential to the invention. These embodiments are for illustrative purposes only and are not to be construed as limiting. For example, a description of an embodiment example with a plurality of elements or components is not to be interpreted as meaning that all of these elements or components are necessary for implementation. Rather, other embodiments may include alternative elements and components, fewer elements or components, or additional elements or components. Elements or components of different embodiments may be combined with each other, unless otherwise indicated. Modifications and variations described for one of the embodiments may also be applicable to other embodiments. To avoid repetition, identical or corresponding elements in different figures are designated with the same reference signs and are not explained more than once. The figures show.

DETAILED DESCRIPTION

Figure 1:
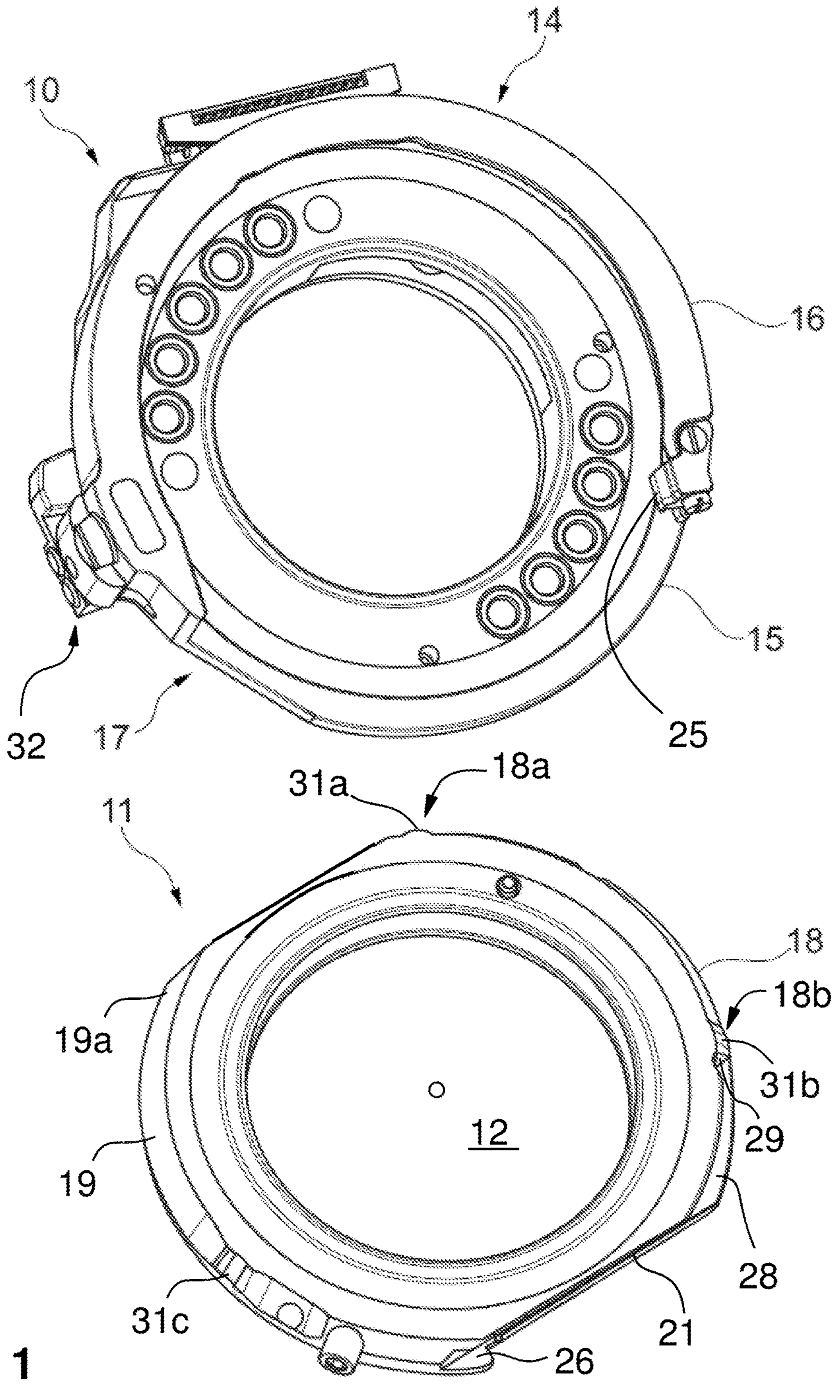
FIG. 1 a mount for attaching a microscope objective to a microscope, wherein the mount to be attached to the microscope is shown at the top in perspective top view, and a ring part is shown at the bottom, which is attached to/formed on the objective and fastened to the mount.
Figure 3:
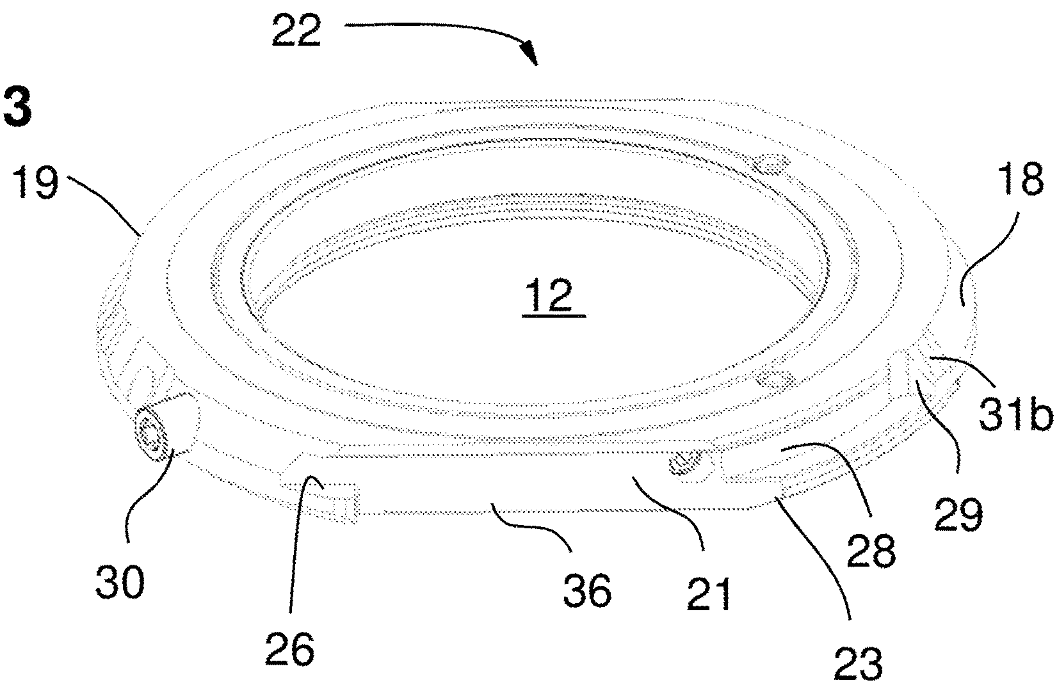
FIGS. 3 and 4 show the ring part in oblique view from above and below.

FIG. 1 shows a mounting device 10 for components, e.g. an objective, of an optical device, e.g. a microscope. It includes a ring part 11 with an eye 12 into which a microscope objective is fastened, e.g. screwed in. The ring part 11 is fastened to a mount or receptacle 14, which is fastened or fastenable to a microscope stand or an objective nosepiece. The receptacle 14 comprises a base ring 15 and a retaining collar 16 provided on the base ring. The retaining collar 16 has a lateral opening 17 through which the ring part 11 can be inserted into the mount 14. The ring part is also shown in various views in FIGS. 3 and 4; the receptacle 14 is also shown in FIG. 5.

Figure 2A:
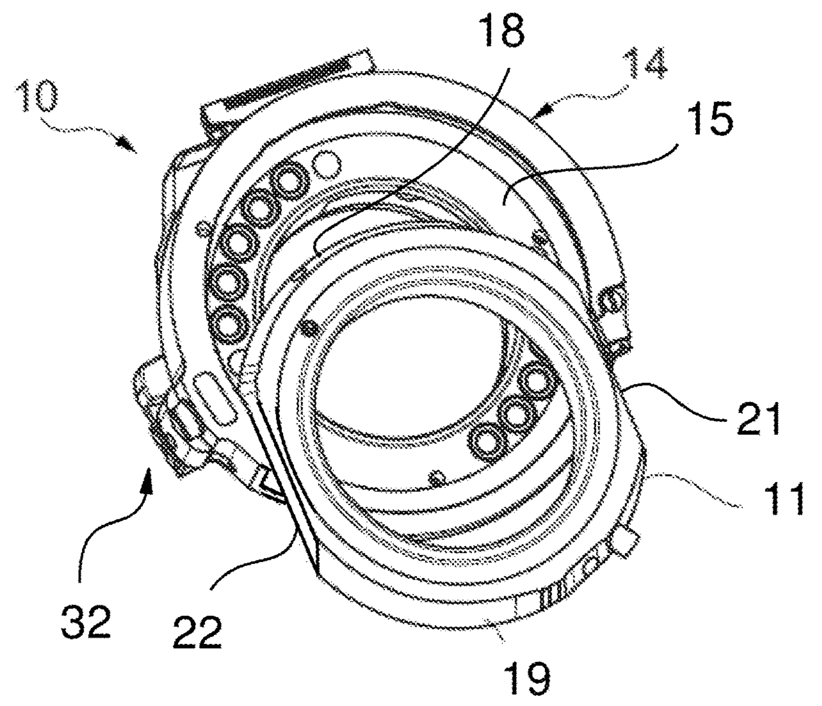
FIGS. 2A-2C show the steps of attaching the ring part to the mount.
Figure 2B:
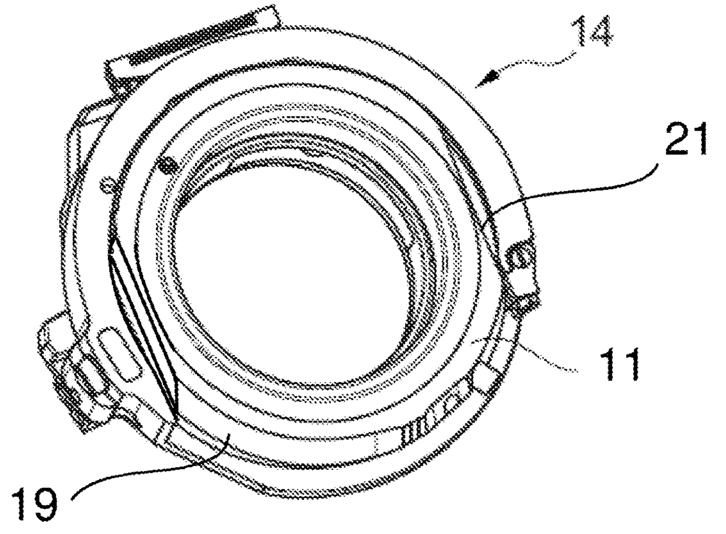
Figure 2C:
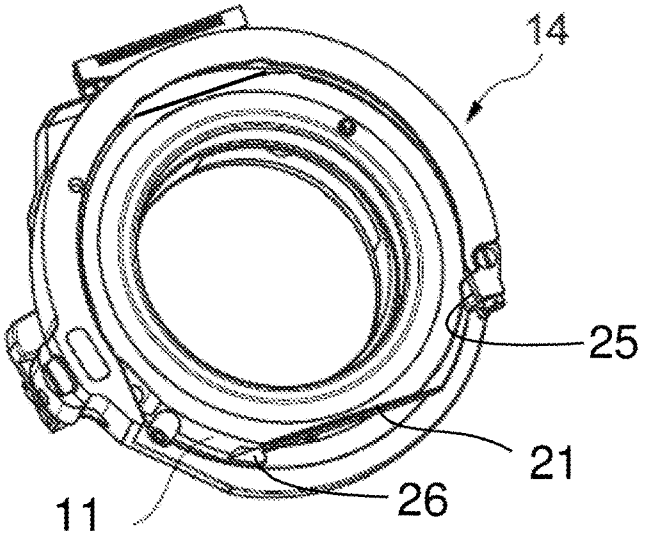
Figure 7A:
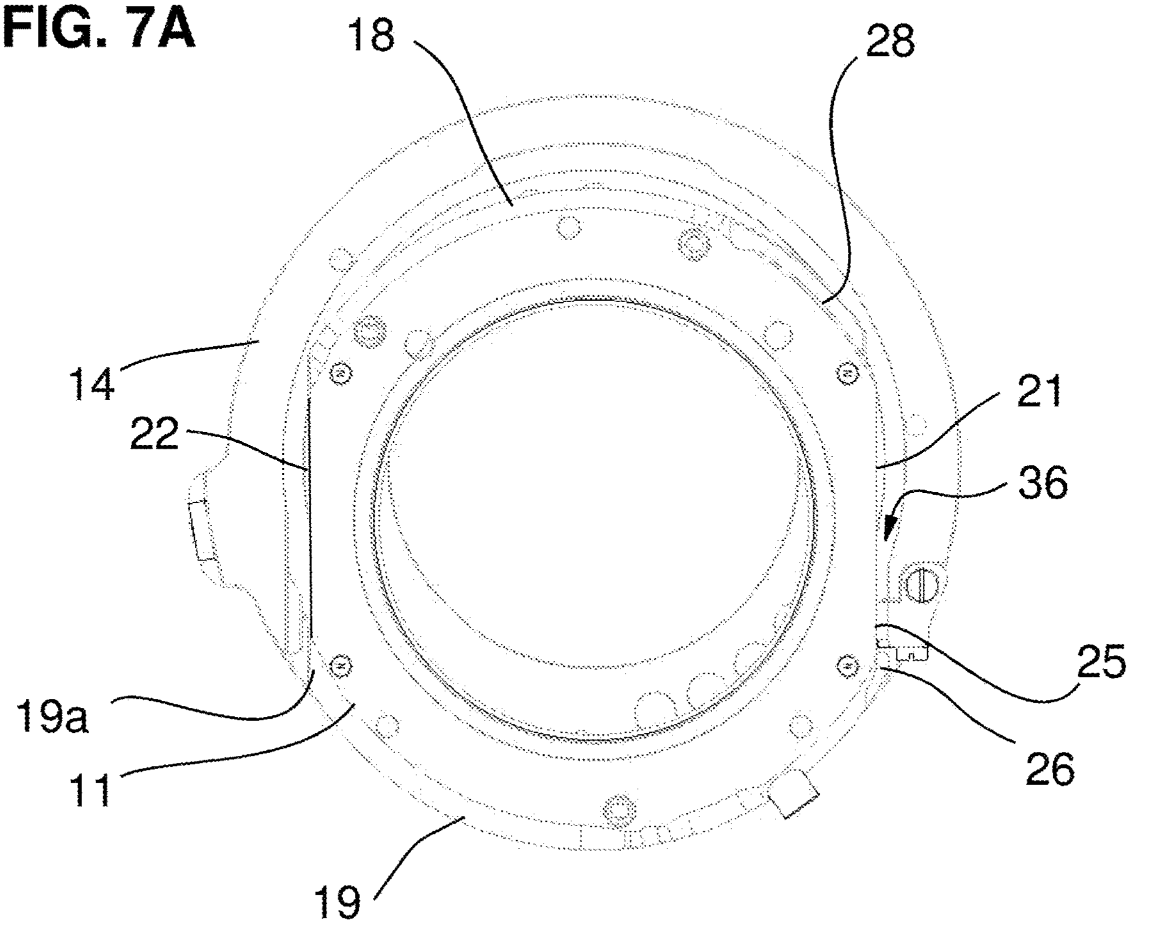
FIG. 7A-7C the ring part being inserted into the mount or receptacle to reach a pre-locking position (FIG. 7A), in the pre-locking position, which corresponds to the position according to FIG. 2B, (FIG. 7B) or at the beginning of a rotation from the pre-locking position to a locking position (FIG. 7C)
Figure 7B:
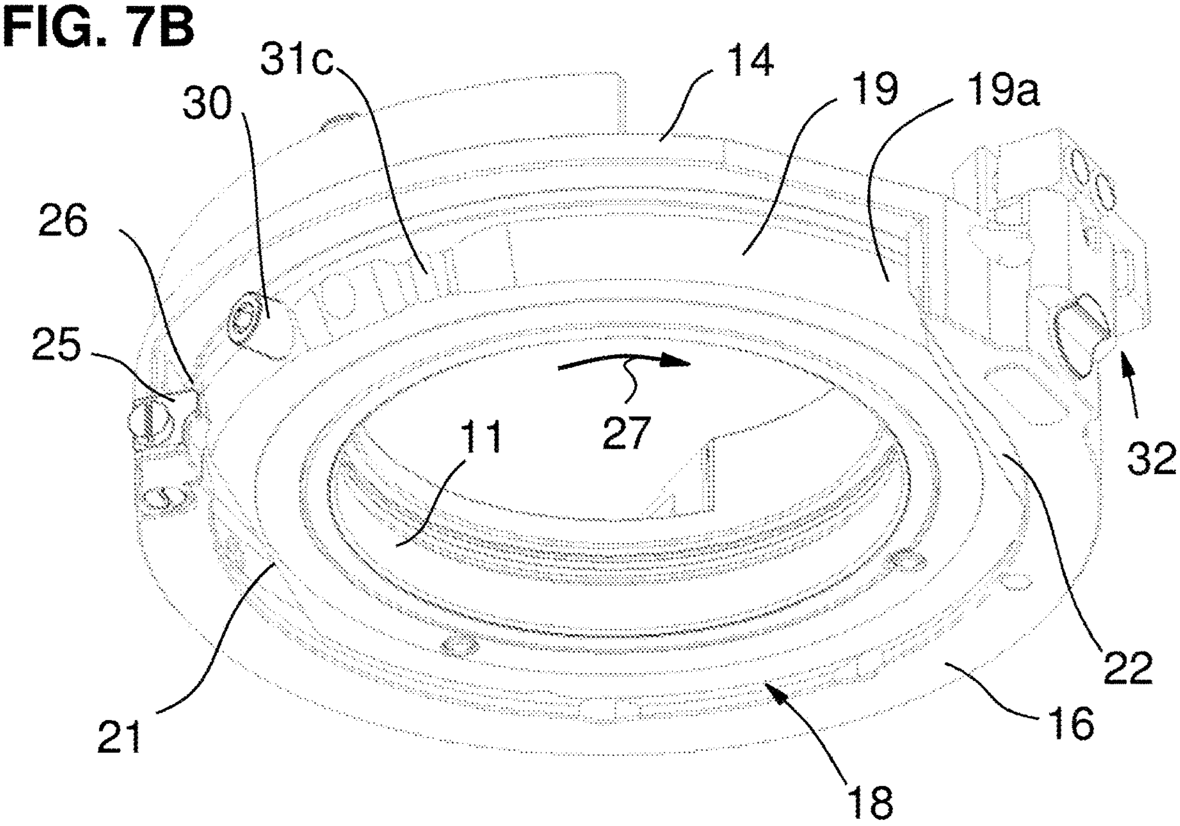
Figure 9:
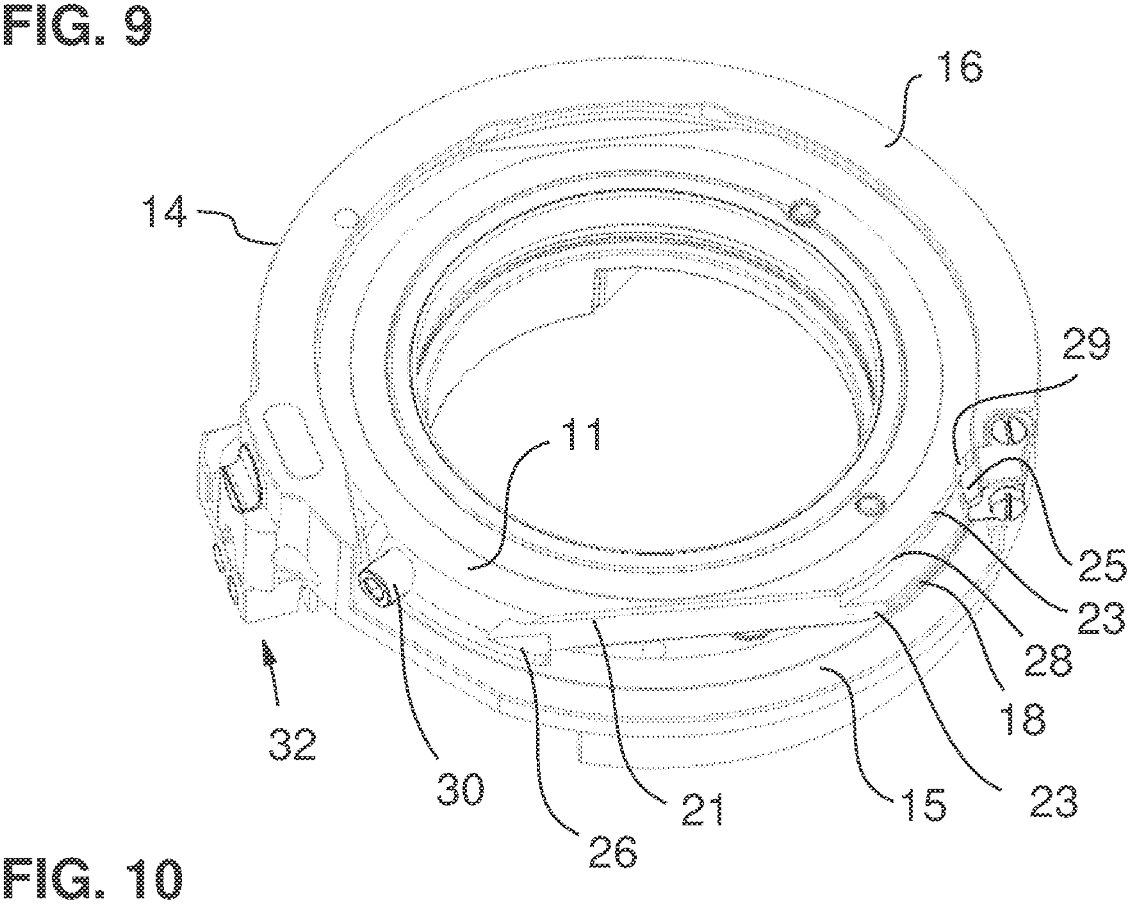
FIG. 9 the ring part in the mount or receptacle in a locking position corresponding to that of FIG. 2C, whereby the elements are folded around the horizontal compared to the view in FIG. 7B.

FIGS. 2A to 2C show the receptacle 14 and the ring part 11 in various stages of connecting the receptacle and the ring part. In FIG. 2A, the ring part 11 is inserted approximately halfway through the lateral opening 17 into the receptacle 14; see also FIG. 7A. FIG. 2B (and also FIG. 7B) shows the ring part 11 fully inserted into the receptacle 14; this is a pre-locking position. FIG. 2C (and also FIG. 9) shows the locking position of receptacle 14 and ring part 11, which is achieved by rotating the ring part by approximately 90° around the ring axis from the pre-locking position (FIGS. 2B and 7B). The apparatus 10 for attaching the microscope objective can be designed as a bayonet interface, with the mount 14 acting as a bayonet mount and the ring part 11 as a bayonet ring.

The outer side of the ring part 11 has conical retaining flanges 18, 19. Furthermore, the retaining collar 16 of the mount has a counter cone 20 on its inner side that tapers away from the base ring. After the ring part 11 has been fully inserted through the lateral opening 17 in the retaining collar 16, a pre-locking position is assumed in which the ring openings completely overlap, and the ring part 11 and the receptacle 14 can be moved from the pre-locking position into the locking position by mutual rotation, in which the conical retaining flanges 18, 19 of the ring part 11 are held on the cone 20 of the retaining collar 16 and press the ring part 11 onto the base ring 15.

However, no retaining flange extends over 360°. Instead, the retaining flanges 18, 19 are separated from each other by two flattened portions 21, 22, which are opposite each other on the ring part 11. The retaining flanges can be further subdivided. The flattened portions 21, 22 reduce the diameter of the ring part 11 so that it can be pushed through the opening 17 into the retaining collar 16 in the appropriate position.

The movement into the pre-locking position is an insertion movement and thus transverse to a ring axis of the ring part 11, which axis extends through the small circle indicated in FIG. 1. In the pre-locking position, only one of the retaining flanges is in engagement with the mating cone 20. This is the retaining flange that is at the front in the direction of insertion, i.e. is inserted first into the receptacle 14. In the embodiment shown, this is the retaining flange 18 (see FIGS. 2A, 2B). The retaining flange 19, on the other hand, which is at the rear in the direction of insertion, does not stabilize the ring part 11 in the pre-locking position. In order to prevent the ring part 11 from detaching from the receptacle in the pre-locked position by a tilting movement, which in FIG. 7B would lead towards the viewer and downwards, the receptacle 14 comprises a securing cam 25 at the edge of the opening 17, which projects towards the inside of the retaining collar 16, and the flattened portion 21 associated with this edge ends with a securing projection 26 projecting radially outwards on the ring part 11 when viewed in the direction of insertion. Securing projection 26 and securing cam 25 are dimensioned in such a way that the securing projection 26 comes to lie between the securing cam 25 and the base 15 of the receptacle in the pre-locking position. This provides the ring part 11 with the necessary stabilization against the aforementioned tilting movement in the pre-locking position and prevents it from falling out (in the case of a microscope with an upright design).

Figure 7C:
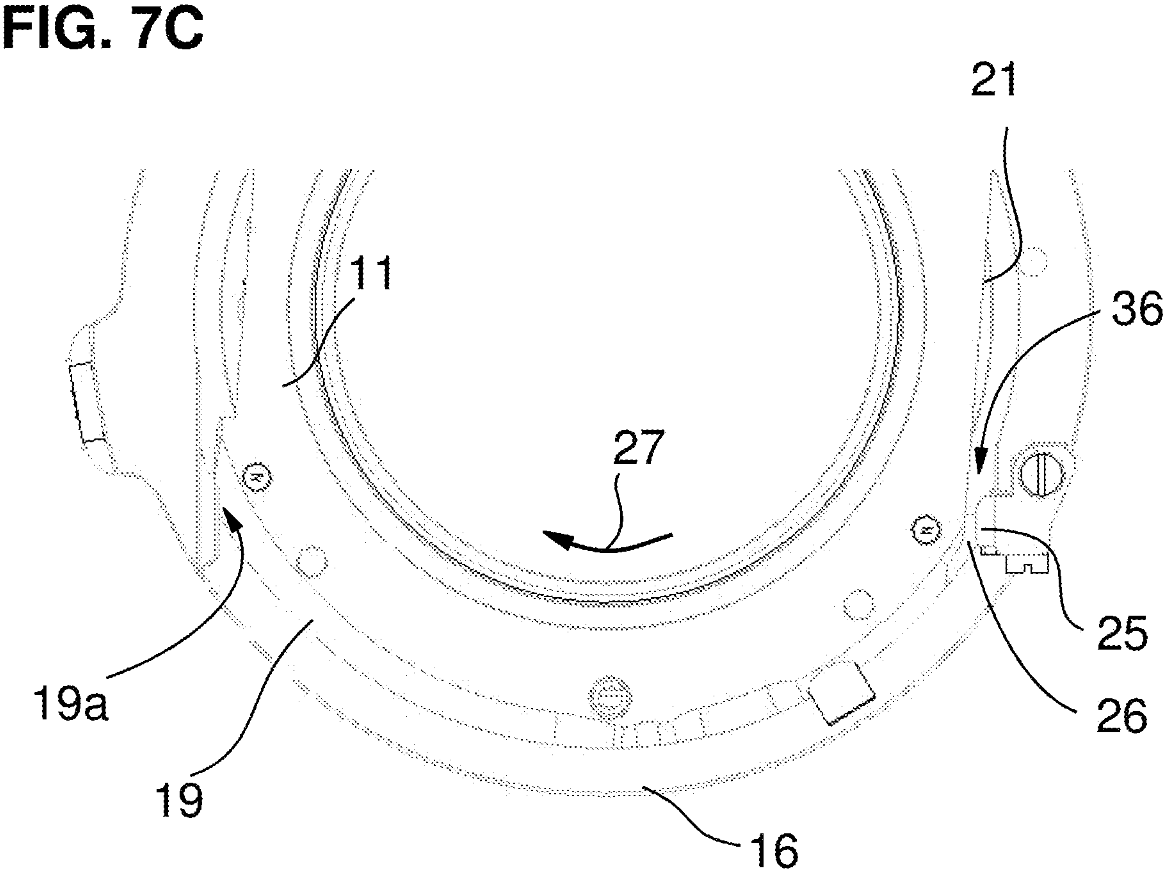

To ensure that the securing cam 25 does not collide with the retaining flange 18 during rotation into the locking position (FIGS. 2C, 9), which is indicated by an arrow 27 in FIGS. 7B, 7C, and that this can still provide support on the base 15 over the largest possible angular range, the side of the retaining flange 18 pointing away from the base 15 is provided with a groove 28, which provides the necessary clearance for the locking cam 25 (see FIGS. 1, 3, 4, 9).

Figure 8:
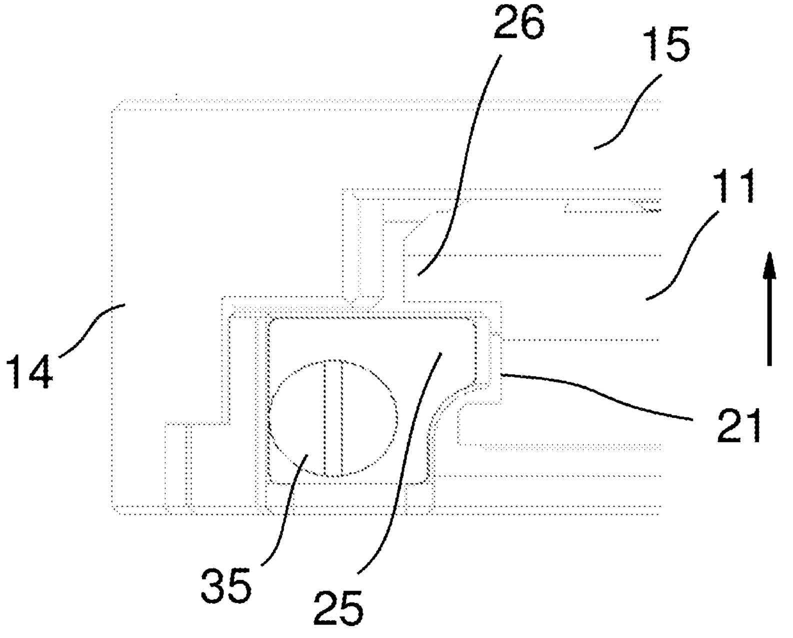
FIG. 8 the effect of a drop guard as a partial side view.

In the embodiment shown, the groove 28 runs out towards the flattened portion 21 on the one hand and ends in a stop 29 on the other hand towards the rest of the retaining flange 18. The groove 28 is limited by a projection 23 on the side of the ring part 11 facing the base ring 15. In this way, the ring part 11 can no longer come loose axially from the receptacle 14 because the securing projection 26 engages behind the projection 23. The securing projection 26 is effective when the ring part 11 is in the pre-locking position, which can be seen in FIGS. 2B and 7B. FIG. 8 shows an enlarged top view of the securing projection 26 and the securing cam 25. The figure shows an arrow indicating the direction in which the ring part 11 has been inserted. In FIGS. 7A and 7C, this is the viewing direction on the drawing plane. The protrusion on the underside of the ring part 11, which has no reference sign, is irrelevant for mounting the ring part 11 on the mount or receptacle 14. In the implemented version, it serves to make it easier to move so that the holes for the magnets do not merge with the edge surface of the ring part 11 with sharp edges.

The protrusion 23 acts as drop guard when the ring part 11 is turned from the pre-locking position to the locking position. In the design shown, the securing cam 25 is covered by the protrusion 23 as the rotation continues in order to ensure drop guard function on upright microscopes.

This also exists while the ring part 11 is rotated into the locking position. FIG. 7C shows the start of this rotation. When the securing cam 25 is no longer covered by the securing projection 26 and is not yet covered by the projection 23, which only begins at the end of the flattened portion 21, the retaining flange 19 is inserted with its section 19*a* into the retaining collar 16 and secures against falling out in the tilting movement already described with reference to FIG. 7B. FIG. 7C shows this state directly at the beginning of the rotational movement in the direction of the arrow 27.

In the area of the flattened portion 21, the projection 23 preferably does not extend and the securing projection 26 ends along the circumference seen with the clearance 36. On the ring part 11, the securing projection 26 is preferably designed so that it only extends at the (in FIGS. 3 and 9 left) end of the flattened portion 21, but not over the entire flattened portion 21. In the further course of the flattened portion 21, no securing projection is formed, but rather the clearance 36. This has the advantage that the ring part 11 can be inserted into the receptacle 14 with almost complete overlap (e.g. an overlap in which the ring axes are spaced apart by a maximum of half the ring radius) of the ring openings of receptacle 14 and ring part 11 with an axial movement along the ring axis-see FIG. 7A. The admissible deviation from a complete overlap is determined by the extent of the shearing projection 26 along the flattened portion 21 and is, for example, a distance between the ring centers of half the ring radius or less. The ring part 11 only needs to be pushed in laterally by this amount after axial positioning. In this way, the ring part 11 can be inserted into the mount or receptacle 14 not only from the side but also, as described above, offset from the optical axis and then pushed into the pre-locking position. This is shown in FIG.

7A. Here, the axial insertion of the ring part 11 into the retaining collar 16 is realized with extensive overlapping of the ring openings of the receptacle and ring part 11. This is particularly advantageous for inverted microscopes, as the objectives are mainly inserted into the nosepiece through a recess in the specimen stage.

If the rotation of the ring part 11 from the pre-locking position to the locking position, i.e. the screwed-in end position, is divided into an angular range of 0° to 90°, there is a risk that the drop guard will not work during the rotation between 7° and 9°, because the securing projection 26 no longer locks the securing cam 25 axially, but the retaining collar does not yet sufficiently secure the retaining flanges 19 against the tilting movement described above. It is considered very unlikely that the operator will let go of the objective at the very beginning of the initiated insertion process.

Alternatively, the securing protrusion 26 or the protrusion 23 can also extend over the flattening 21 so that the ring part 11 is held in the mount 14 in any rotational position during the screwing-in process into the end position, should the screwing-in process be interrupted and the objective be released. This is particularly advantageous if the retaining collar 16 and retaining flange 19 are not designed to provide drop guard protection as described above during the screwing-in process.

Figure 6:
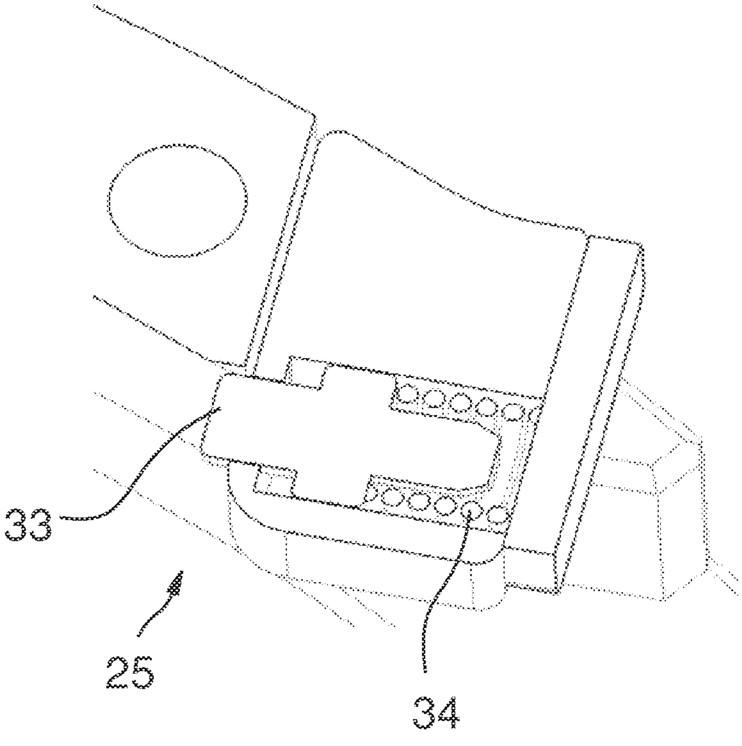
FIG. 6 a sectional view of a resetting device, which is provided on the mount or receptacle.

Optionally and preferably, the securing cam 25 performs a dual function in that it comprises a resetting device. This engages the stop 29 if the ring part has been over-rotated in the direction of the arrow 27. Although a rotation stop 30 in the form of a pin or bolt screwed into the side of the ring part 11 is provided to limit the rotation, this, together with the edge of the opening 17, only represents a rough stop and does not provide a fit with regard to the rotational position of the ring part 11 in the mount or receptacle 14. For this fit, at least one V-bearing surface is provided on the ring part 11 as a contact point, which interacts with a clamping device 32. In the embodiment shown, there are two V-bearing surfaces 31*a*, 31*b* on the retaining flange 18. The ring part 11 could be over-rotated against the clamping device 32, which could lead to jamming of the aligning elements of the clamping device 32 in relation to the V-bearing surface 31*a* and/or 31*b*. In order to avoid this situation or, if it occurs, to resolve it, the resetting device formed on the securing cam presses the stop 29 back against the direction of rotation 27. For this purpose, in one possible embodiment shown in FIG. 6, the cam 25 comprises a reset plunger 33 on its side facing away from the opening 17, which is pressed by a spring 34 to the side 32 and thus against the stop 29 when over-rotation occurs or begins. The over-rotation protection is coordinated with the spring 34 by means of the reset plunger 33 in conjunction with the stop 29 so that the ring part 11 can be reset. In addition, the spring force of the spring 34 is designed so that the ring part 11 is not pushed back beyond the V-support during the resetting process. For this purpose, the tension force of the spring 34 can preferably be adjusted using a screw 35.

Although this does not prevent over-tightening, it is corrected by the resetting device 29, 33, 34. In the event of over-tightening, i.e. incorrect operation, the ring part 11 jams on the line between 31*c* and 31*a*/18*a* in the mount or receptacle 14. This operating error is corrected again by the resetting plunger 33. A repeatable position can therefore be realized and an accidental operating error is excluded.

A further additional function of the safety catch consisting of the securing cam 25 and securing projection 26 is that the securing cam 25, which protrudes at the rear end of the flattened portion 21 in the direction of insertion, prevents the ring part 11 from being inserted the wrong way round into the mount or receptacle 14.

A recess 31*c* in the ring part 11 serves as a latching position in which the spring element engages from the mount or receptacle 14 in order to limit rotation and thus prevent improper operation. The rotation stop 30 prevents over-rotation on this side beyond the recess 31*c*. A V-bearing is formed by the V-bearing surfaces 31*a*, 31*b* and the retaining collar 16 of the mount or receptacle 14. In the areas marked 18*a*, 18*b*, the retaining flange 18 and the V-bearing surfaces 31*a*, 31*b* coincide. The areas 18*a* and 18*b* are further extended by the retaining flange 18 and the surfaces lie on an inclined plane, thus forming the retaining function.

The retaining flange 19 has an optional additional function. Its surface is then set back so far that the locking roller runs freely from the spring element 32 out of the mount or receptacle 14 when it is screwed into the locking position. This reduces wear and tear and the reduced resistance suggests to the operator that correct operation is only possible in the latched position up to the screwed-in end position.

Figure 4:
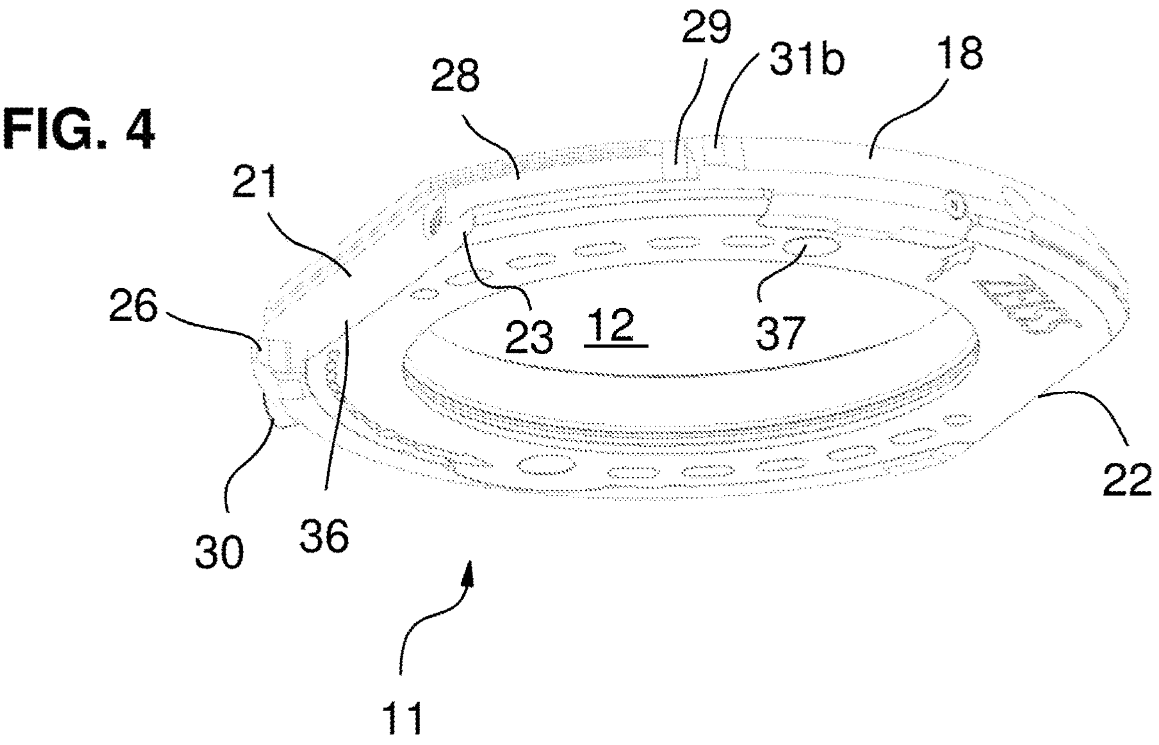
Figure 5:
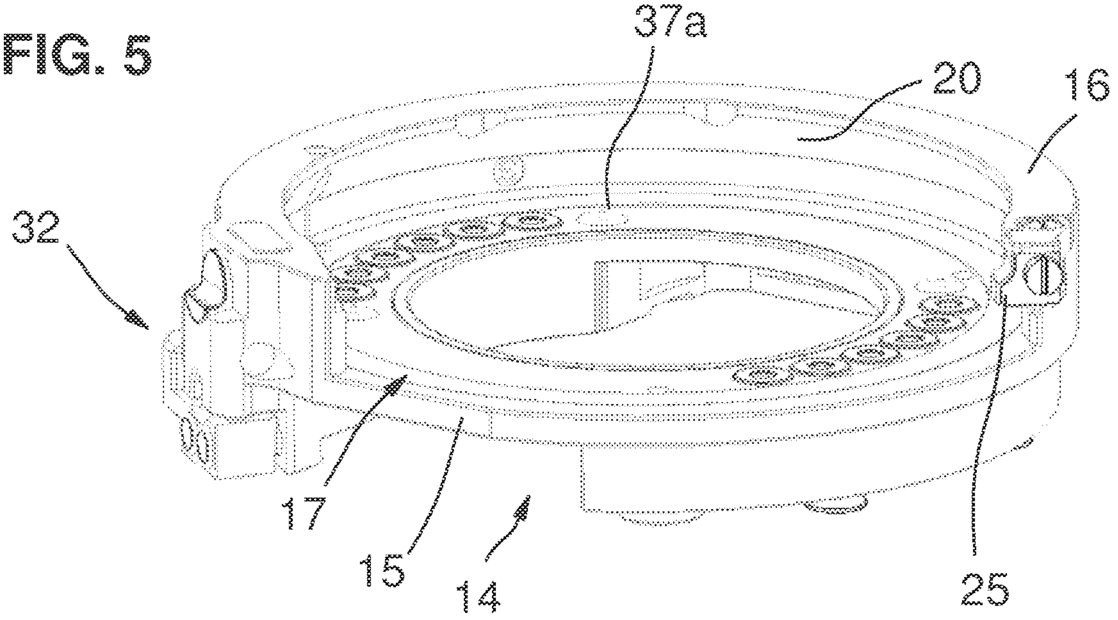
FIG. 5 the mount or receptacle from an oblique top view.

FIGS. 4 and 5 show optional magnets 37, 37*a*, which interact in the pre-locking position and additionally pull the ring part 11 onto the base 15.

Figure 10:
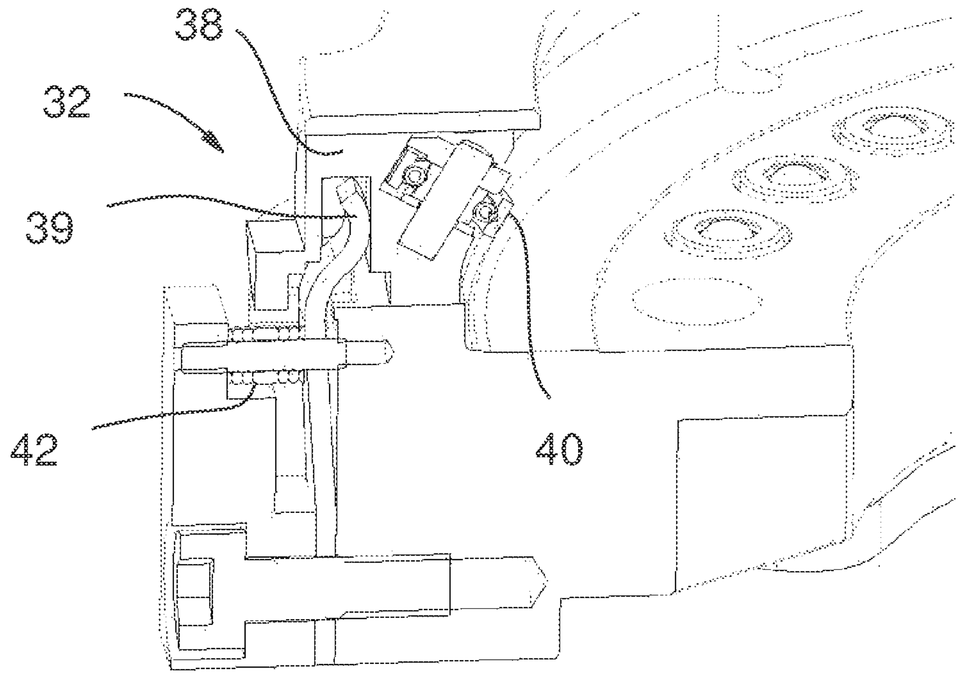
FIG. 10 is a sectional view of a clamping device that clamps the ring part in the mount or receptacle, eliminating play.

FIG. 10 shows the clamping device 32 in an embodiment example. Here, it has a leaf spring 39 which presses a thrust body 42, which comprises a rotatably mounted pressure roller 40, onto the corresponding V bearing surface. The leaf spring 39 can optionally be supported by a coil spring 42.

Figure 11:
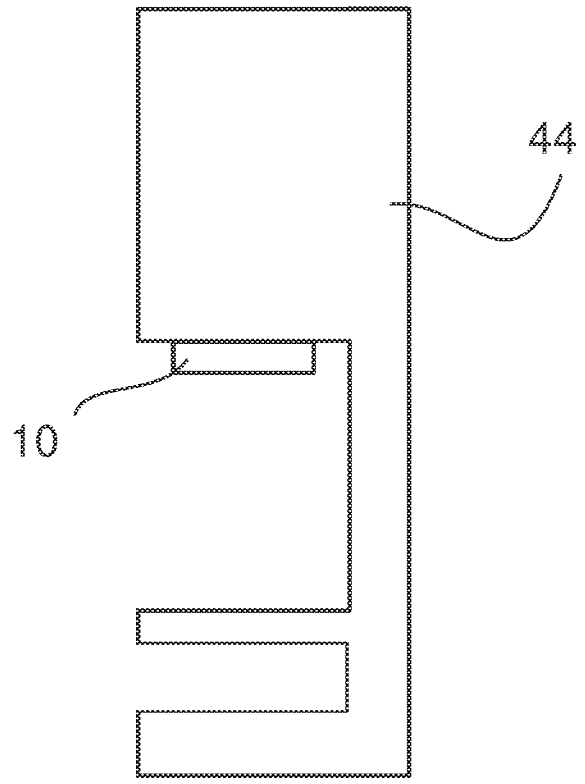
FIG. 11 is a schematic diagram of mounting device 10 on a microscope stand 44.

FIG. 11 is a schematic diagram showing mounting device 10 on a microscope stand 44.

What is claimed is:

1. An apparatus for attaching a microscope objective to a microscope component, wherein the apparatus comprises:

a mount which is capable of being arranged on, or fastened to, the microscope component and comprises an annular base and a retaining collar with a lateral opening comprising a width, a ring part, which comprises an eye, that is capable of attaching the microscope objective or is capable of being attached to or formed on the microscope objective, the ring part comprising at least two retaining flanges, and two opposing flattened portions which are set back relative to an outer circumference of the retaining flanges and which are spaced from each other by a distance, wherein the distance is smaller than the width of the lateral opening, so that the ring part with its flattened portions is pushable through the lateral opening transversely to a ring axis of the mount into the retaining collar into a pre-locking position, wherein in the pre-locking position not all retaining flanges engage in the retaining collar, and wherein the ring part is rotatable in the mount from the pre-locking position into a locking position in which all retaining flanges engage in the retaining collar, a securing cam formed on an edge of the opening and projecting towards an interior of the retaining collar, and a securing projection formed at one end of one of the flattened portions, which securing projection projects towards an outside of the ring and comes to lie between the securing cam and the annular base of the mount when the ring part is in the pre-locking position and which securing projection together with the securing cam blocks the ring part against release from the mount along the ring axis, wherein the securing cam comprises, on its side pointing away from the opening a resetting device which, when the ring part rotates beyond an end position assigned to the locking position, presses the ring part back in the direction of the pre-locking position.

2. The apparatus according to claim 1, wherein the retaining flange which adjoins the other end of the flattened portion provided with the securing projection defines a groove which extends along the retaining flange and through which the securing cam runs when the ring part is rotated into the locking position.

3. The apparatus according to claim 2, wherein the groove comprises at least on its side oriented towards the mount a projection which, together with the securing cam, prevents the ring part from slipping axially out of the mount when rotating from the pre-locking position into the locking position.

4. The apparatus according to claim 1, wherein the resetting device engages an end of the groove when pressing back.

5. The apparatus according to claim 1, wherein the resetting device comprises a reset plunger on the securing cam, the reset plunger biased in a direction pointing away from the opening.

6. The apparatus according to claim 1, wherein at least one pair of magnets is arranged on the mount and the ring part, of which one individual magnet is attached to the mount and the other magnet is attached to the ring part, the individual magnets of the one pair of magnets being arranged in such a way that in the pre-locking position the individual magnets pull the ring part and the mount together along the ring axis.

7. The apparatus according to claim 1, wherein the securing projection comprises a length along one of the flattened portions which is dimensioned in such a way that the ring part can be inserted into the mount with a movement along its ring axis at a distance between the ring axes of the ring part and of the mount which does not exceed half the ring radius.

8. The apparatus according to claim 1, wherein the mount is capable of being arranged on or fastened to, the microscope component, and wherein the microscope component is a microscope stand.

* * * * *